Figure 1:
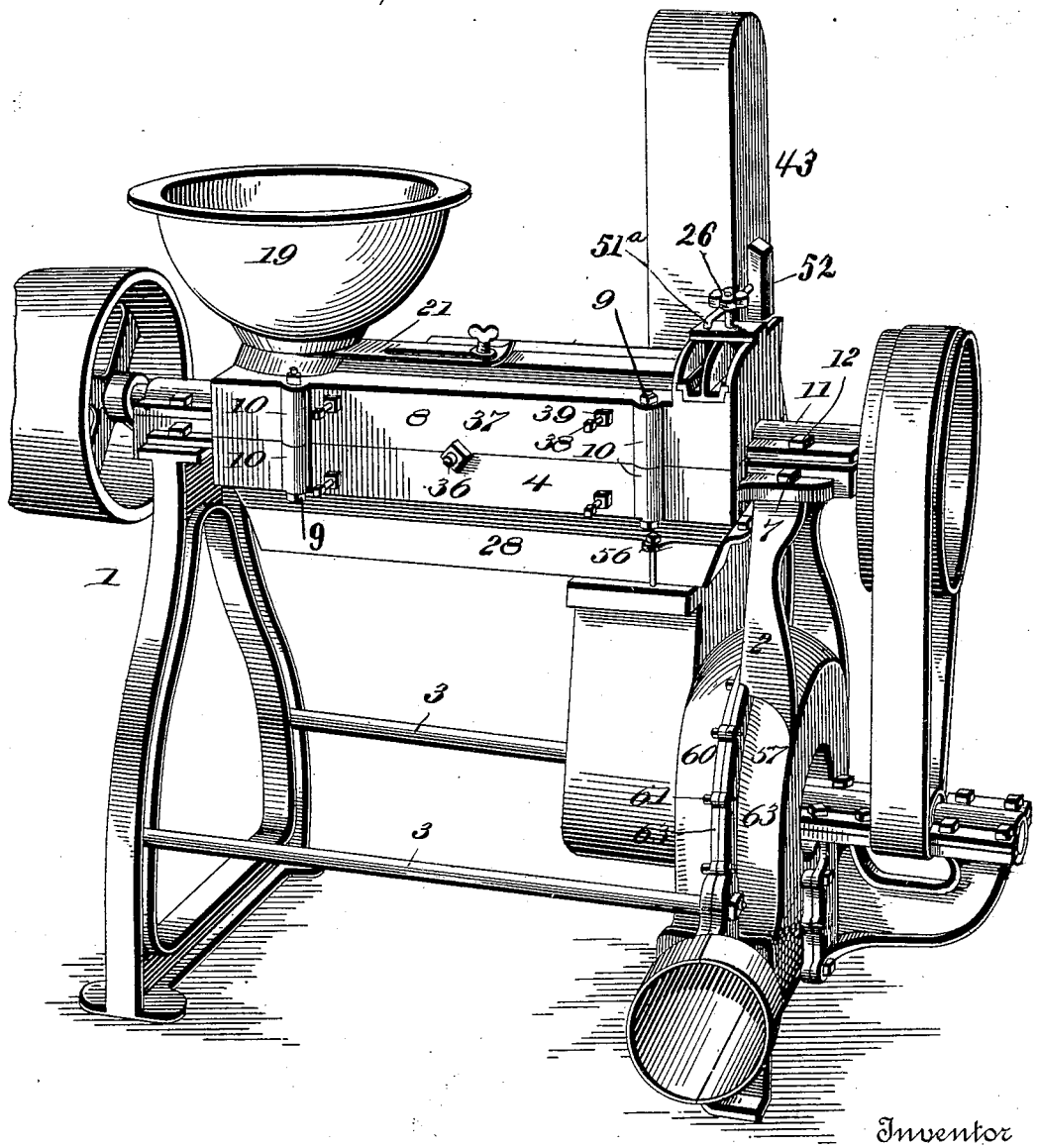

No. 680,588. Patented Aug. 13, 1901.
C. A. HEGE.
MACHINE FOR HULLING COFFEE, &c.
(Application filed Sept. 26, 1899.)
(No Model.) 4 Sheets—Sheet 1.

Witnesses
L. C. Hills
Chester A. Baker

Inventor
Constantine A. Hege,
by R. S. Hudman
Attorney

THE NORRIS PETERS CO., PHOTO-LITHO., WASHINGTON, D. C.

No. 680,588. Patented Aug. 13, 1901.
C. A. HEGE.
MACHINE FOR HULLING COFFEE. &c.
(Application filed Sept. 26, 1899.)
(No Model.) 4 Sheets—Sheet 2.
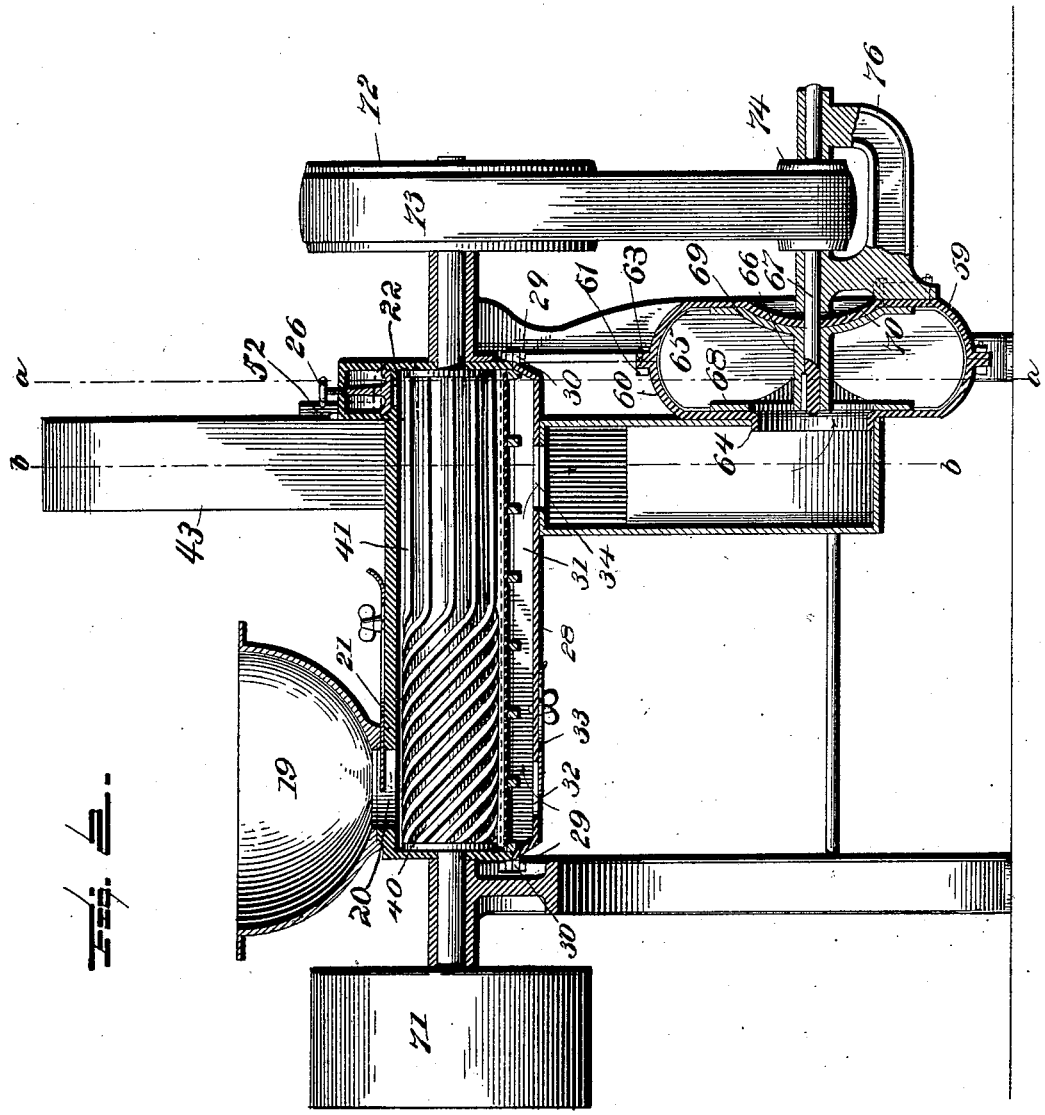
Witnesses:
L. C. Hills
Chester A. Baker
Inventor
Constantine A. Hege,
by
Attorney No. 680,588. Patented Aug. 13, 1901.
C. A. HEGE.
MACHINE FOR HULLING COFFEE, &c.
(Application filed Sept. 26, 1899.)
(No Model.) 4 Sheets—Sheet 3.
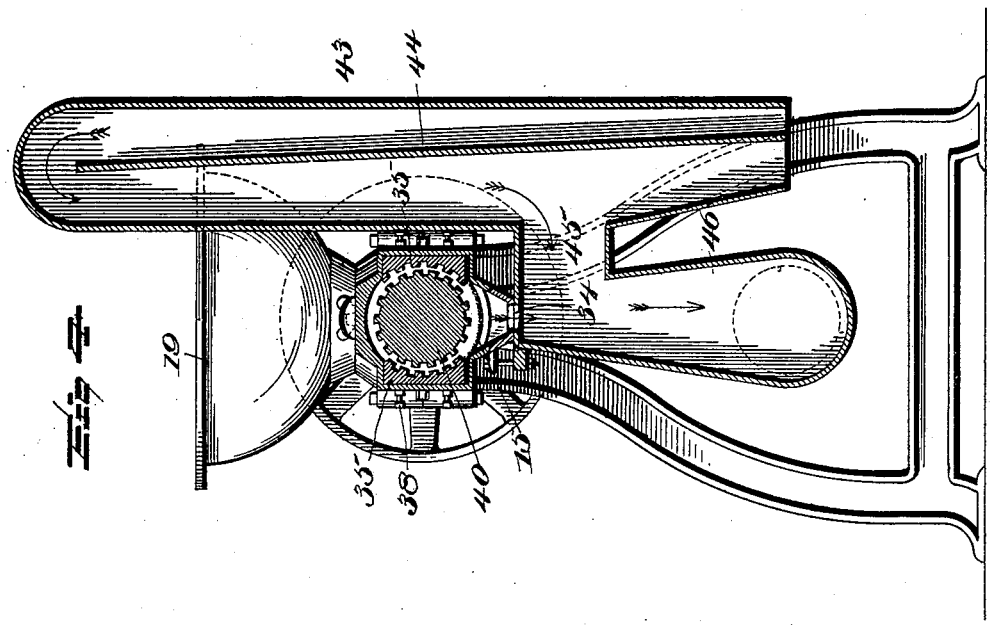
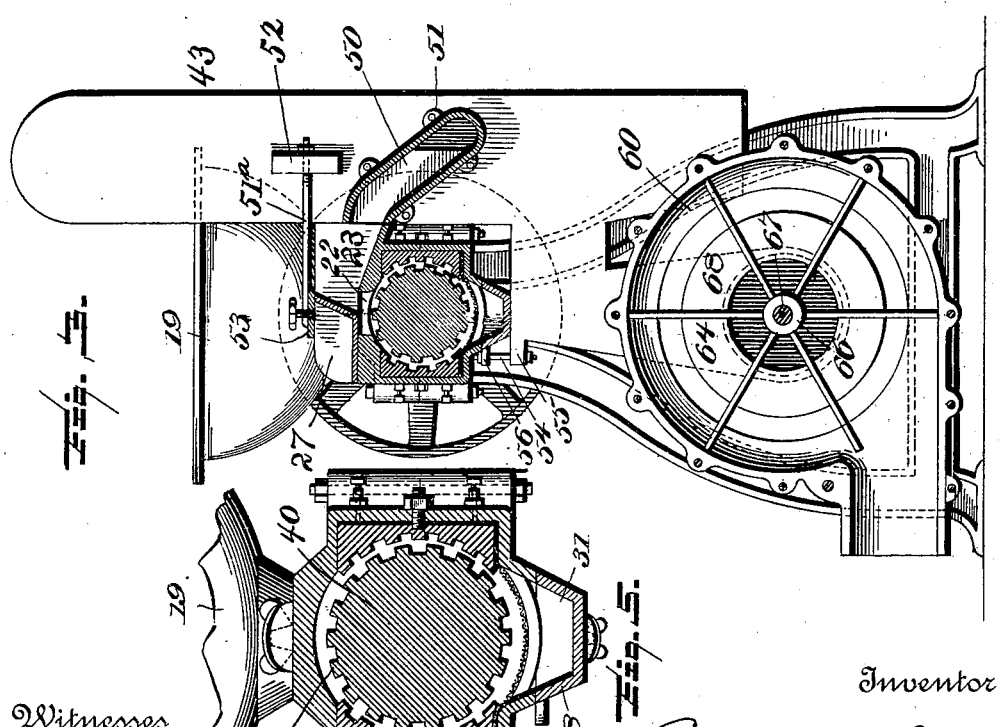
Witnesses
L. C. Hills.
Chester A. Baker
Inventor
Constantine A. Hege,
by R. S. Henderson
Attorney.

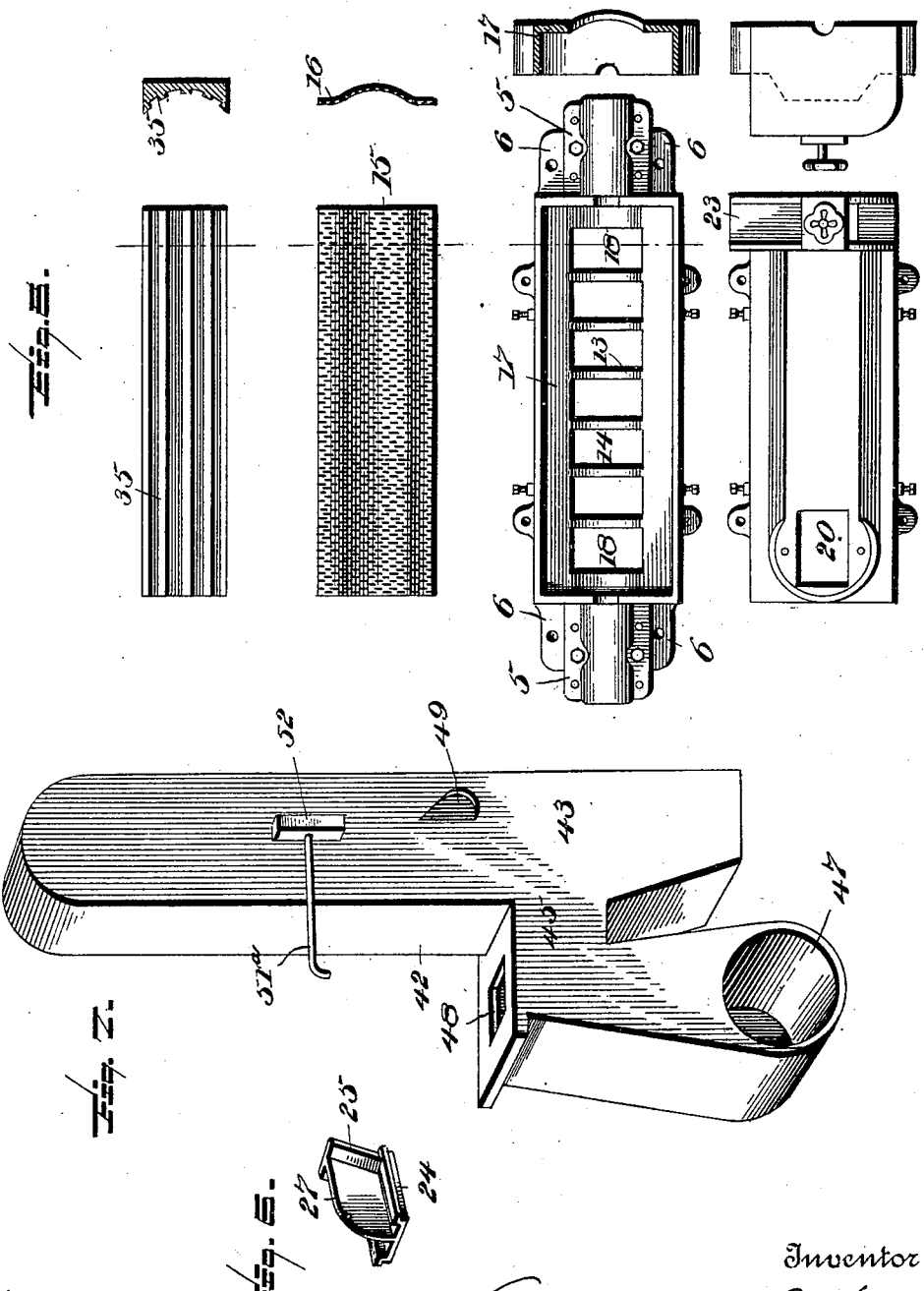

UNITED STATES PATENT OFFICE.

CONSTANTINE ALEXANDER HEGE, OF SALEM, NORTH CAROLINA, ASSIGNOR TO C. A. HEGE & CO., OF SAME PLACE.

MACHINE FOR HULLING COFFEE, &c.

SPECIFICATION forming part of Letters Patent No. 680,588, dated August 13, 1901.

Application filed September 26, 1899. Serial No. 731,729. (No model.)

*To all whom it may concern:*

Be it known that I, CONSTANTINE ALEXANDER HEGE, a citizen of the United States, residing at Salem, in the county of Forsyth and State of North Carolina, have invented certain new and useful Improvements in Machines for Hulling Coffee and for other Purposes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for hulling and cleaning coffee and for other purposes; and it has for its object to provide a machine simple in construction and efficient for the objects in view and in which the hulls and chaff are separated from the coffee and drawn off, while the coffee will be discharged separate from the hulls and chaff, and in which also the hulling-cylinder will be kept cool, so that the quality of the coffee will not be seriously impaired by being subjected to undue heat from the friction during the operation of being hulled and cleaned, and also in which the several parts will be under the easy control of the operator and may be adjusted and manipulated to give the best results under the conditions existing at the time that the machine is in operation.

To the accomplishment of the foregoing and of such other objects as may hereinafter appear the invention consists in the construction and also in the combination of parts hereinafter particularly described and then sought to be specifically defined by the claims, reference being had to the accompanying drawings, forming a part hereof, and in which—

Figure 1 is a perspective of the machine complete with a suction fan-cleaning attachment used in connection therewith. Fig. 2 is a longitudinal vertical section through the machine. Fig. 3 is a vertical cross-section on the line *a a* of Fig. 2. Fig. 4 is a vertical cross-section on line *b b* of Fig. 2. Fig. 5 is a vertical central cross-section through the machine on an enlarged scale. Fig. 6 is a detail perspective view of the slide-valve for regulating the discharge of coffee from the machine. Fig. 7 is a detached perspective view of the separating-leg, and Fig. 8 is a plan view and sectional view, respectively, of the ribbed side concave, the screen, the lower half of the hulling-cylinder casing, and also a plan and end view of the upper half of the hulling-cylinder casing.

In the drawings the numerals 1 and 2 designate the leg-castings, which are connected together by the bolts 3. These legs support the shell or casing for the hulling-cylinder, which case is formed of a lower section or half 4, formed with boxes 5 to receive the journals of the hulling-cylinder and provided with flanges 6, through which and into the legs will pass bolts 7, so as to secure the sections to the legs, the upper section or half 8 of the casing being secured to the lower half by means of bolts 9, passed through lugs 10, formed on the opposite sides of the two parts of the casing, and removable caps 11, placed over the journals of the hulling-cylinder at the opposite ends of the casing and secured to the boxes 5 by screws or bolts 12.

The lower half 4 of the casing is formed with an open bottom 13, across which extend curved ribs 14, which serve to strengthen and brace a concave screen 15, which will fit inside of the section 4 of the casing above the ribs and having side flanges 16 resting upon the ledges 17, formed on the inside of the casing, the ends of the screens resting upon the end ledges 18, formed on the inside of the casing and curved to conform to the curve of the screen.

The upper section or half 8 of the casing is provided at one end with a hopper 19, discharging through the opening 20 into the interior of the casing and at such point provided with adjustable slide-valve 21 for regulating the inflow of the unhulled coffee, and at the opposite end with an opening 22, formed in its top for the discharge of the coffee from the casing, a trough or spout 23, leading from said discharge-opening and formed, preferably, with an inclined bottom, as shown clearly in Fig. 3 of the drawings, for receiving and directing the coffee received from said outlet. This discharge-outlet is provided with a slide-valve 24, which is formed with a deflector 25, designed to direct the coffee in the direction of the discharge end of the spout 23 as the coffee is impelled through the outlet 22. This valve is adjustable, so as to control the discharge of the coffee, and is held at its adjustment by means of a hand-screw 26, which bears against a rib 27, formed on the valve. The spout or trough 23 is open at its top, so that coffee can be inspected and its condition ascertained to determine the character of the work being done, and which if not entirely satisfactory can be remedied by adjustment of the discharge-valve to suit the conditions of the particular lot of coffee being hulled.

Beneath the lower section or half 4 of the casing is the shell 28, bolted to the section 4 by bolts 29, passing through the ears or lugs 30 and forming an exhaust-chamber 31 beneath the open bottom and screen of the hulling-cylinder casing. This exhaust-chamber shell is provided with an opening 32 at the bottom, controlled by slide-valve 33, regulating the intake of air at that point, and also provided with an opening 34, which will communicate with the separator-leg hereinafter described when a separator is used, and when a separator is not used said opening may be closed or entirely omitted.

The hulling-cylinder casing is provided interiorly on opposite sides with ribbed concaves 35, adjustable to and from the hulling-cylinder by threaded bolts 36 and nuts 37, so as to vary the space between the hulling-cylinder and concaves to suit the conditions of the coffee being hulled. Adjusting-screws 38 pass through nuts 39 and through the sides of the casing and bear against the concaves 35, so as to hold the same in proper position in relation to the hulling-cylinder.

The hulling-cylinder is designated by the numeral 40 and is provided with ribs 41, which pass spirally around the hulling-cylinder at the end next to the hopper 19 and about the middle of the hulling-cylinder extend in lines parallel with the cylinder to its opposite end, where the coffee is discharged. In other words, the spiral portions of these ribs merge in the straight or parallel portions, the ribs being continuous from end to end of the cylinder, and thus a better feeding of the coffee from end to end and the more effective hulling of the same obtained.

In some forms of the machine it is desirable to use in connection with it a separator and a fan for the purpose of drawing the hulls and chaff out of the machine and separating the coffee therefrom while passing through the separator and also for the creating of such a suction of air through the machine that the working parts of the machine and the coffee will be kept cool during the operation of hulling, thus increasing the efficiency of the machine and preventing discoloration of the coffee, which might be caused by unduly heating the coffee in the operation of hulling. For that purpose I have devised a separator such as is illustrated in the drawings, the same being designated by the numeral 42 in the drawings. This separator comprises a leg 43, which is open at the bottom, as indicated in Fig. 4 of the drawings, and closed at the top and is provided with a partition 44, extending from the bottom of the leg or thereabout and nearly to the top thereof. This separator-leg on the side next to the machine is provided with a lateral extension 45 in communication with the leg and having a downward extension 46, which at its lower portion has an opening 47 on one side which will communicate with the fan, as hereinafter described, the top of the extension 45 being formed with an opening 48, which will register with the opening 34 in the bottom of the exhaust-chamber shell 28, as indicated in Fig. 2 of the drawings. The separator-leg 43 has also an opening 49 formed in its side, through which will communicate one end of a throat 50, the other end of which communicates with the trough 23, which leads from the discharge-opening 22 in the casing of the hulling-cylinder, said throat 50 being secured to the leg 43 by bolts passed through ears 51, formed on the throat. In this way the hulled coffee and the hulls passing out of the machine with it are directed into the separator-leg between the partition 44 and the outside wall of the leg. The separator is held in position by means of a rod $51^a$, connected at one end with a block 52, secured to the separator-leg, and at the other end to a cross-piece 53, formed as a part of the side walls of the trough 23, and also by means of a bolt 54, passing through a flange 55 of the leg, and an ear 56, formed on the exhaust-chamber shell 28. This construction admits of the separator-leg being easily and quickly attached to the machine and separated therefrom when desired.

The supporting-leg 2 of the machine has cast as a part thereof one side 57 of a fan-casing 59, the other side 60 of the fan-casing being made separate and the two parts of the fan-casing being secured together by bolts 61, passing through flanges 63, formed on the two parts of the casing. The side 60 of the fan-casing has a flange 64, which extends through the opening 47 in the lower extension of the separator-leg, said flange affording some support for the separator-leg, and thus serving to assist in holding the separator-leg firmly in position. Within the fan-casing are the fan-blades 65, extending from the sleeve 66, which is keyed to the fan-driving shaft 67, said sleeve having cast therewith the rings 68 and 69, which are cast with the fan-blades, the ring 69 being dished, so as to fit to the concave portion 70 of the side 57 of the fan-casing, thus insuring the fan-blades always moving true.

When the separator is used, the machine is driven by power, and in that event a drive-pulley 71 is affixed to one end of the journal or shaft of the hulling-cylinder, the other end of the shaft or journal being provided with a pulley 72, from which a belt 73 transmits power to a pulley 74 on the drive-shaft of the fan, said drive-shaft being supported by a bracket 76, which is divided at the point where the pulley 74 is located, so that said pulley may thus revolve in the bracket, the bracket being bolted to the side of the fan-casing, as shown in Fig. 1 of the drawings, and being provided with a suitable boxing for the drive-shaft fan, as illustrated in the same figure.

In operation the unhulled coffee is placed in the hopper 19, from which it passes into the machine, and being received by the spiral ribs of the hulling-cylinder it is fed forward, being carried around and around by the rotation of the hulling-cylinder and having the hulls rubbed and broken and detached from the berry, the berries and the hulls traveling in the space between the hulling-cylinder and the casing and finally discharged through the opening in the top of the casing and then through the trough and throat into the separator-leg, where the coffee-berries by reason of their heavier weight drop down the leg and are discharged at the lower end, the lighter hulls being carried up the leg by air-suction and over the partition into the space on the opposite side thereof and thence downward, any coffee-berries that are carried over the partition falling to the bottom of the leg and escaping at that point, while the hulls are carried from the leg by the air-suction through the extension 45 and into the lower extension 40 and thence into the fan-casing, where they are discharged through the outlet of the fan-casing by the air-blast. While this operation is progressing, the smaller chaff is sucked through the perforated bottom of the hulling-cylinder casing and into the exhaust-chamber, from whence it is carried by the air-suction into the lower extension of the separator-leg and thence out through the fan. The suction through the exhaust-chamber creates an air circulation through the hulling-casing, so as to keep the parts and also the coffee-berry cool as well as carrying off the chaff from the casing. The suction through the exhaust-chamber is controlled and more or less air admitted to maintain the temperature desired by adjustment of the valve 33 to the air-inlet opening 32 at the bottom of the exhaust-chamber, and the rate of discharge of the coffee and hulls from the leg is regulated by the slide-valve 24, as previously mentioned. A valve may also be provided in the upper part of the separator-leg, so as to regulate the force of the air-suction in the leg.

In small machines embodying some features of my invention the separator-leg and fan may be omitted and the hulling-cylinder may be turned by hand instead of by power, and in such case the exhaust-chamber shell 28 may be omitted. It will be observed that by the manner described for securing the separator-leg and also the exhaust-chamber shell to the machine said parts can be readily detached and the machine operated without them, although in large machines said parts are employed, as much better results are obtained by their presence and use when coffee is being hulled in large quantities. The construction and mode of assembling the parts also admits of their being readily separated for the purpose of transportation and also for the purpose of enabling easy access to the different parts when necessary for any reason.

I have illustrated and described with particularity the preferred details of construction and arrangement of the various parts; but it is obvious that changes can be made therein and the essential features of my invention employed.

Having described my invention and set forth its merits, what I claim is—

1. In a machine for hulling coffee and other purposes, the combination with the casing having a feed-opening at one end and a discharge-opening at the other end, and a ribbed hulling-cylinder within said casing, of a slide-valve controlling the discharge-opening, said valve having an upwardly-inclined deflector for directing the course of the material passing through the discharge-opening, substantially as described.

2. In a machine for hulling coffee and other purposes, the combination with the casing having a feed-opening at one end and a discharge-opening at the other end, and a ribbed hulling-cylinder within said casing, of a regulating-valve to the discharge-opening, and a trough for receiving the discharged material, a portion of said trough next to said valve being open for the inspection of the material passing through the same to determine the adjustment of the valve to the discharge-opening, substantially as described.

3. In a machine for hulling coffee and other purposes, the combination with the casing formed with a feed-opening at one end and a discharge-opening at the other end, and a ribbed hulling-cylinder within said casing, of a regulating-valve to the discharge-opening provided with an inclined deflector, and a trough provided with an inclined bottom for receiving and delivering the material passing through said discharge-opening, substantially as described.

4. In a machine for hulling coffee and other purposes, the combination with the casing having a feed-opening at one end and a discharge-opening at the other end, and a ribbed hulling-cylinder within said casing, of a trough leading to said discharge-opening, a slide-valve having a deflector for controlling and directing the passage of material through said discharge-opening in the trough and provided with a rib, and means bearing against said rib for holding the valve to its adjustment, substantially as described.

5. In a machine for hulling coffee and other purposes, the combination with the casing having a screen-bottom, of the ribbed hulling-cylinder within said casing, the ribbed concaves on opposite sides of said ribbed cylinder, and means for moving said concaves to and from said cylinder, substantially as described.

6. In a machine for hulling coffee and other purposes, the combination with the casing having an open bottom, and inwardly-extending ledges, of the ribbed hulling-cylinder within said casing, the concave screen extending across the open bottom and formed with flanges resting upon the said ledges, and the ribbed concaves fitting on opposite sides of said ribbed cylinder and extending over the flanges of said screen, substantially as described.

7. In a machine for hulling coffee and other purposes, the combination with a casing having a screen-bottom and provided with a feed-opening at one end and a discharge-opening at the other end, and an exhaust-chamber beneath the screen-bottom of the casing, of a separator located at the discharge end of the casing and in communication with the discharge-opening thereof and also with the opening in the discharge end of the exhaust-chamber whereby said separator will receive the hulls from the discharge-opening of the casing and the chaff from the exhaust-chamber without the hulls of the discharge-opening of the casing passing through the exhaust-chamber, and a fan in communication with the separator for creating an air-current therein, substantially as described.

8. In a machine for hulling coffee and for other purposes, the combination with the casing having a screen-bottom and provided with a feed-opening at one end and a discharge-opening at the other end, an exhaust-chamber beneath the screen-bottom, and a ribbed hulling-cylinder within the casing, of a separator-leg open at its lower end and provided with a partition and having a lateral extension in communication with the discharge end of the exhaust-chamber, an extension below said discharge end and in communication with the fan, means for delivering the material from the discharge-opening in the casing and into the separator-leg between its partition and outer wall, and a fan for creating an air-current through the separator-leg, substantially as described.

9. In a machine for hulling coffee and other purposes, the combination with the casing of the hulling-cylinder having a screen-bottom, an exhaust-chamber beneath the screen-bottom, the casing and the exhaust-chamber having discharge-openings at the same end, of the separator-leg open at its lower end and provided with a vertical partition terminating below the upper end of the leg, said leg having a lateral extension formed with an opening registering with an opening in the exhaust-chamber, means for collecting the material from the discharge-opening of the casing and delivering it into the separator at one side of its partition, and a fan communicating with a portion of the separator-leg below its lateral extension, substantially as described.

10. In a machine for hulling coffee and other purposes, the combination with the hulling-cylinder casing having a screen-bottom and an exhaust-chamber beneath the screen-bottom, the casing and exhaust-chamber having discharge-openings at the same end, of the separator-leg having a portion located to one side of the casing and extending above and below the same and provided with a lateral extension lying beneath the exhaust-chamber having an opening registering with the discharge-opening of the said chamber, a fan communicating with said leg, and means for detachably supporting said leg in position, substantially as described.

11. In a machine for hulling coffee and other purposes, the combination with the hulling-cylinder casing and the exhaust-chamber both provided with discharge-openings at the same end, of the separator-leg open at its lower end and provided with a vertical partition terminating below the top of the leg and having a lateral extension communicating with the discharge-opening of the exhaust-chamber, a trough leading from the discharge-opening in the casing, a throat leading from said trough and opening into the side of the separator-leg back of the partition therein, and a fan for creating an air-current through the leg, substantially as described.

12. In a machine for hulling coffee and other purposes, the combination with the casing of the hulling-cylinder, and the exhaust-chamber, of the separator-leg, the fan-casing having one portion thereof formed as a part of one of the legs of the machine and the other portion made separate therefrom and having a flange entering the side of the separator-leg, substantially as described.

13. In a machine for hulling coffee and other purposes, the combination with the casing of the hulling-cylinder and the exhaust-chamber and the legs for supporting the same, of the separator-leg communicating with the exhaust-chamber and the casing, and the fan for creating an air-current through the separator and exhaust-chamber, said fan comprising a casing having a portion thereof formed as a part of one of the legs, said portion having a convex inner face, the other portion of the casing being provided with a flange engaging the separator-leg, a rotating shaft having two rings fitting against the inside of the casing, one of said rings being dished to conform to the convex face of the casing, and both of said rings having the fan-blades connected thereto, substantially as described.

In testimony whereof I affix my signature in presence of two witnesses.

CONSTANTINE ALEXANDER HEGE.

Witnesses:
CAREY BROWN,
W. W. BROWN.